No. 627,416. Patented June 20, 1899.
T. HILL.
VEHICLE FRAME.
(Application filed Mar. 3, 1899.)
(No Model.) 2 Sheets—Sheet 1.
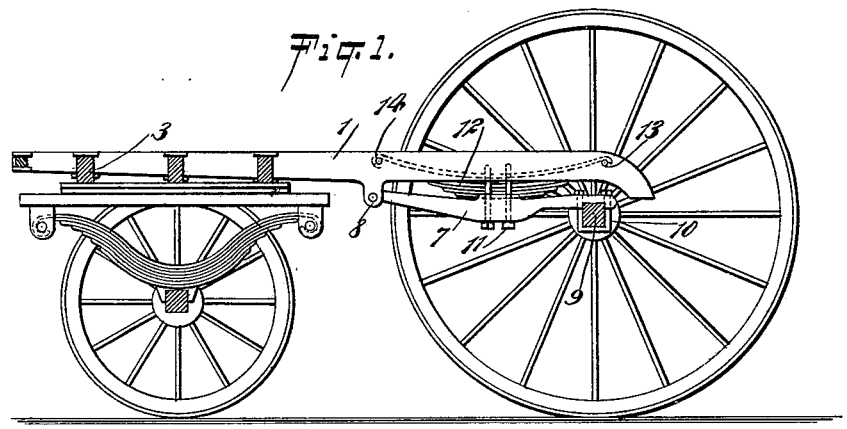
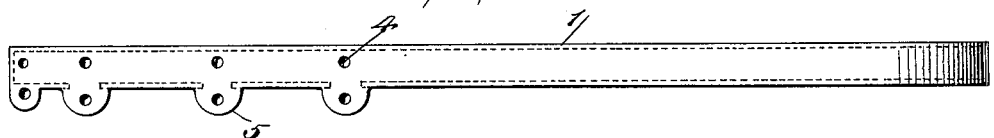
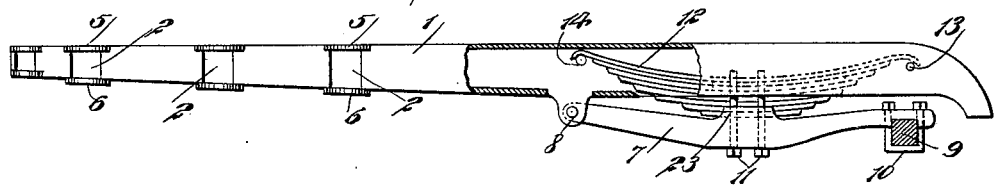
WITNESSES: INVENTOR
William P. Gaebel Thomas Hill
C. R. Ferguson BY
ATTORNEYS.
THE NORRIS PETERS CO., PHOTO-LITHO., WASHINGTON, D. C.

No. 627,416. Patented June 20, 1899.
T. HILL.
VEHICLE FRAME.
(Application filed Mar. 3, 1899.)

(No Model.) 2 Sheets—Sheet 2.

WITNESSES:
William P. Gaebel
C. R. Ferguson

INVENTOR
Thomas Hill
BY
ATTORNEYS.

UNITED STATES PATENT OFFICE.

THOMAS HILL, OF JERSEY CITY, NEW JERSEY.

VEHICLE-FRAME.

SPECIFICATION forming part of Letters Patent No. 627,416, dated June 20, 1899.

Application filed March 3, 1899. Serial No. 707,606. (No model.)

*To all whom it may concern:*

Be it known that I, THOMAS HILL, of Jersey City, in the county of Hudson and State of New Jersey, have invented a new and Improved Vehicle-Frame, of which the following is a full, clear, and exact description.

This invention relates particularly to improvements in the side-bars of dumping-vehicle frames and to a novel arrangement of parts where springs are applied, especially where it is desirable that the greater portion of the weight of the load should lie forward of the rear axle.

The object of my invention is to provide a dumping-vehicle which shall be comparatively cheap to construct and of a very simple construction, and although extremely light, yet strong and durable.

The embodiment of my invention consists, first, in the continuous hollow side-bars of the frame, the said side-bars being provided with openings in their inner sides for the reception of the ends of cross-bars; second, I provide draw-bars the forward ends of which are pivoted to the side-bars of the frame or to pendants therefrom, the rear ends being connected in a suitable manner to the rear axle.

A further object is to so arrange the draw-bars as to make them adaptable to the carrying of leaf-springs midway of their ends. The springs may be engaged at their arch portion with the draw-bar and secured by means of clips, while their upper ends are in contact with the side-bars, so as to readily yield to the pressure of the load. In some instances, however, the springs may be fastened at their arch portion to the side-bars and have their ends engaged with and adapted to slide upon the draw-bars.

I will describe a vehicle-frame embodying my invention, and then point out the novel features in the appended claims.

Reference is to be had to the accompanying drawings, forming a part of this specification, in which similar characters of reference indicate corresponding parts in all the figures.

Figure 5:
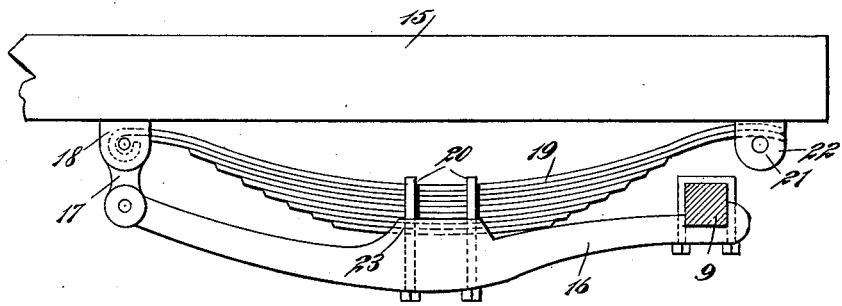
Figure 6:
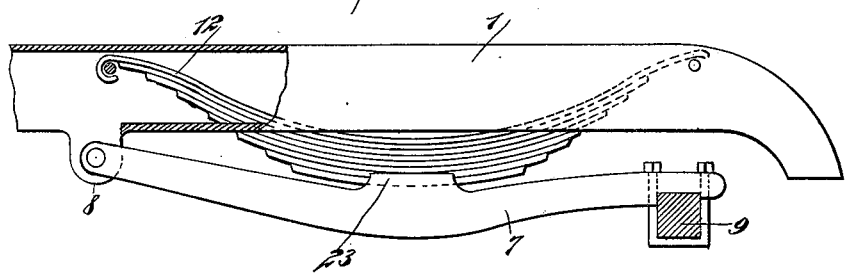
Figure 7:
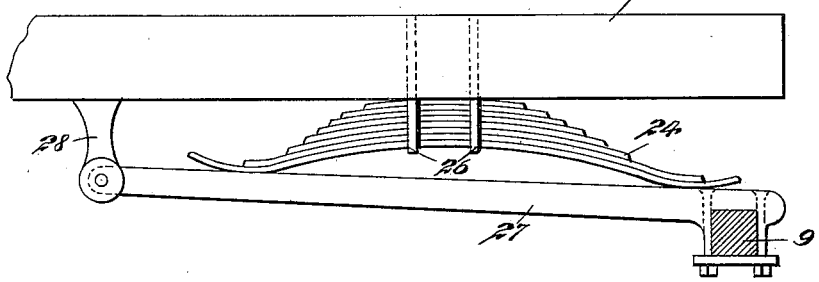

Figure 1 is a sectional elevation of a vehicle, showing a portion of a frame embodying my invention. Fig. 2 is an inside elevation of one of the side-bars of the frame. Fig. 3 is a top plan view thereof. Fig. 4 is a partial section and partial inside elevation of a side-bar and a spring and draw-bar connected thereto. Fig. 5 is a side view of a modified construction. Fig. 6 is a similar view of another modified construction, and Fig. 7 is a similar view of still another modified construction.

In the drawings I have shown but one side of the frame; but it is to be understood, of course, that the two sides are alike. The frame comprises tubular metal side-bars 1, which at the forward portion are inclosed at all sides excepting that the inner wall is provided with openings 2, into which the ends of the cross-bars 3 are extended, these cross-bars being intended to engage with the fifth-wheel of the vehicle when said fifth-wheel is employed, and they are secured in place by bolts extended through perforations 4 in said side-bars and also through perforations in the cross-bars and in the upper and lower lugs 5 6 on the side-bars. These lugs serve to materially strengthen the connection between the cross-bars and the side-bars.

In Figs. 1 and 4 I have shown a draw-bar 7, pivotally connected at its forward end between lugs 8, extended downward from the side-bars, and at its rear end the draw-bar is secured to the axle 9 by means of a clip or clips 10. Secured to the center of the draw-bar by means of clip-bolts 11 is a spring 12, which extends through an opening in the bottom of the side-bar and has its upwardly-curved ends engaging with the top wall of the side-bar, and to prevent the displacement of the spring relative to the side-bar I place pins or bolts 13 14 underneath the ends of the spring. The connections will be sufficiently loose, however, to allow the ends of the spring to slide upon the top wall of the side-bar when said spring is depressed or expanded. In this example of my invention the drawing strain will be upon the draw-bars 7 and the rear axle, and obviously the greater portion of the weight of the load will be supported on said draw-bars forward of the rear axle. I have shown the top rear ends of the side-bars as curved downward, adapting the frame to a dumping-body, which it is not deemed necessary to show here.

In Fig. 5 I have shown a side bar 15, and in this case a draw-bar 16 extends from the axle 9 and has its forward end connected by means of a link 17 to the lugs 18, extended downward from the side-bar. A spring 19 is connected to the draw-bar 16 by means of clips 20, and the forward end of this spring engages around the pivot from which the links 18 are suspended, and the rear end of said spring bears against the bottom wall of the side-bar, but is curved loosely around a pin 21 between lugs 22, extended downward from the side-bar. In this example the drawing strain will be upon the draw-bar, as before described; but the draw-bar, owing to the connected links 17, will have a slight longitudinal swinging motion under the influence of the spring.

In Fig. 6 the parts are similar to those shown in Figs. 1 and 4, excepting that the center of the spring rests loosely on the draw-bar 7, and in all the examples of my improvement, as described above, the draw-bar is provided at its sides with upwardly-extended cheek-pieces 23, which will engage with the sides of the spring and prevent any possible lateral movement thereof on the draw-bar.

In Fig. 7 I have shown a spring 24 as having its central or arch portion secured to a side-bar 25 by means of clips 26, and the ends of this spring 24 bear and are adapted to have a sliding motion on the draw-bar 27, which at one end is connected to the axle 9 and at the other end to lugs 28, extended downward from the side-bar.

Having thus fully described my invention, I claim as new and desire to secure by Letters Patent—

1. A vehicle-frame, comprising hollow metal side-bars having openings through their inner side walls to receive the ends of cross-bars, and lugs extended from the side-bars to engage against the upper and lower sides of the cross-bars, substantially as specified.

2. A vehicle-frame, comprising hollow metal side-bars, cross-bars having their ends extended through openings in the inner side walls of said side-bars, draw-bars having connection at one end with the side-bars and at the other end with the vehicle-axle, and springs arranged between the draw-bars and side-bars, substantially as specified.

3. A vehicle-frame, comprising side-bars, draw-bars having connection at the forward end with said side-bars and having connection at the rear end with the rear axle, and springs arranged between said draw-bars and the side-bars the said springs resting upon the draw-bars, substantially as specified.

4. A vehicle-frame, comprising hollow metal side-bars, draw-bars having pivotal connection at the forward end with said side-bars and rigidly connected at their rear ends with the rear axle of the vehicle, and springs supported on said draw-bars and having upwardly-turned ends engaging with the side-bars, substantially as specified.

5. A vehicle-frame, comprising side-bars, cross-bars connecting the side-bars, draw-bars having connection with the side-bars and also with the axle of the vehicle, and springs arranged between the draw-bars and side-bars the said springs resting upon the draw-bars, substantially as specified.

THOMAS HILL.

Witnesses:
JNO. M. RITTER,
C. R. FERGUSON.